United States Patent
Avery, Jr. et al.

(10) Patent No.: US 7,374,600 B2
(45) Date of Patent: May 20, 2008

(54) SYSTEM AND METHOD FOR EXCLUDING FALSE BACK PRESSURE FAULTS AFTER INSTALLATION OF A PARTICULATE TRAP FILTER

(75) Inventors: Richard M. Avery, Jr., W. Bloomfield, MI (US); Dennis M. Letang, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 547 days.

(21) Appl. No.: 11/046,166

(22) Filed: Jan. 28, 2005

(65) Prior Publication Data

US 2006/0169136 A1 Aug. 3, 2006

(51) Int. Cl.
*B01D 46/46* (2006.01)
*F01N 3/021* (2006.01)

(52) U.S. Cl. .................. 95/19; 95/22; 95/273; 96/417; 96/418; 96/419; 96/421; 55/282.3; 55/283; 55/385.3; 55/523; 55/DIG. 10; 55/DIG. 30; 60/274; 60/295; 60/297; 60/311; 701/102; 116/DIG. 25

(58) Field of Classification Search .................... 95/19, 95/22, 23, 273, 278; 55/282.2, 282.3, 283, 55/385.3, 523, 524, DIG. 5, DIG. 10, DIG. 30; 60/273, 274, 295, 297, 303, 311; 701/102, 701/110; 116/DIG. 25; 96/417, 418, 419, 96/421

See application file for complete search history.

(56) References Cited

U.S. PATENT DOCUMENTS

| | | |
|---|---|---|
| 4,424,709 A | 1/1984 | Meier, Jr. et al. |
| 4,492,079 A | 1/1985 | Takagai et al. |
| 4,986,069 A | 1/1991 | Barris et al. |
| 5,190,017 A | 3/1993 | Cullen et al. |
| 5,353,591 A | 10/1994 | Kabasin et al. |
| 5,373,733 A | 12/1994 | Fuchs et al. |
| 5,681,988 A | 10/1997 | Koch et al. |
| 5,849,251 A | 12/1998 | Timko |
| 6,397,587 B1 | 6/2002 | van Nieuwstadt |
| 6,651,638 B1 * | 11/2003 | Oakes ........................ 60/311 |
| 6,666,020 B2 | 12/2003 | Tonetti et al. |
| 6,854,265 B2 * | 2/2005 | Saito et al. ............ 55/DIG. 30 |
| 6,947,831 B2 * | 9/2005 | van Nieuwstadt ........... 701/102 |
| 6,966,178 B2 * | 11/2005 | Saito et al. .................... 60/311 |
| 7,153,342 B2 * | 12/2006 | Koga et al. ................ 55/282.3 |
| 7,162,867 B2 * | 1/2007 | Saito et al. ................... 60/297 |
| 2002/0038545 A1 * | 4/2002 | Sakaguchi .................... 60/311 |
| 2003/0023367 A1 * | 1/2003 | Avery et al. ................. 701/110 |
| 2003/0033800 A1 | 2/2003 | Tonetti |
| 2003/0115854 A1 | 6/2003 | Tamura et al. |
| 2003/0200022 A1 | 10/2003 | Streichsbier |
| 2003/0230075 A1 | 12/2003 | Saito |
| 2007/0101702 A1 * | 5/2007 | Saito ........................... 60/274 |

* cited by examiner

*Primary Examiner*—Jason M. Greene
(74) *Attorney, Agent, or Firm*—Brooks Kushman P.C.

(57) ABSTRACT

A method and system for preventing or minimizing false back pressure faults caused by a new particulate filter in an engine exhaust system. When a new particulate filter is placed in an engine exhaust system, the normal back pressure threshold for the fault detection system is increased by a new filter offset amount. Back pressure faults at the normal level are not recorded for a limited period of engine operation and only records back pressure faults that exceed the normal back pressure threshold by the value of the new filter offset.

19 Claims, 2 Drawing Sheets

SYSTEM AND METHOD FOR EXCLUDING FALSE BACK PRESSURE FAULTS AFTER INSTALLATION OF A PARTICULATE TRAP FILTER

BACKGROUND OF THE INVENTION

1. Field of the Invention

This invention relates to a system and method for preventing false back pressure faults caused by the replacement of particulate filters that trap particulate matter in exhaust gases of an engine.

2. Background Art

Particulate trap filters are provided in engine exhaust systems to filter particulates and soot from exhaust gases. For example, diesel exhaust gases must be cleaned in a particulate filter before being vented to the atmosphere to conform to environmental regulations.

Back pressure in an exhaust system may increase due to increased restriction caused by the accumulation of particulates in the particulate filter. Excessive back pressure may cause damage to the engine or decrease engine performance. Sensors may be used to measure the back pressure to avoid damage to the engine. An operator may be signaled to check the engine or particulate filter when the back pressure exceeds a predetermined level. The particulate filter may then be removed and replaced or regenerated to reduce back pressure to an acceptable level.

New particulate filters when initially installed in the exhaust system of an engine may exhibit excessive back pressure for a limited period of time, i.e. over a "break in" period for the filter. When the new particulate filter is installed, increases in back pressure relating to the new filter flow properties may result in confusion as to whether the new filter is functioning property and may result in unnecessary service inquiries. When an operator observes illumination of a check engine light ("CEL") or service now light ("SNL") that is diagnosed as having been caused by high back pressure fault, the operator may believe that the service was not properly performed or that the particulate filter is not functioning properly. False back pressure faults may also occur with new engines and may result in unnecessary customer complaints, service calls and warranty expense.

There is a need for a method and system for monitoring exhaust filter back pressure that does not provide false indications of excessive back pressure after a new particulate filter is installed in the exhaust system. A system and method are needed that can be adapted to and used with a variety of different types and sizes of engines and in a variety of operating conditions.

SUMMARY OF THE INVENTION

According to one aspect of the present invention a method for avoiding false back pressure faults in an engine control system is provided. According to the method, when new filters are installed in an engine exhaust system a diagnostic message is set to a new filter installed status to indicate that a new filter was installed at a first operation duration value (for example, mileage or time). The current operation duration value is compared to the first operation duration value after the diagnostic message is set to the new filter installed status. If the difference between the current operation duration value and the first operation duration value is less than a predetermined duration value, a new filter status indicator is provided to the control system. A normal filter status indicator is provided if the difference between the current operation duration value and the first operation duration value is greater than the predetermined duration value. A sensed exhaust back pressure value is read from a sensor and the control system sets a back pressure threshold value. Next, the system determines whether a diagnostic message is set at the new filter status indicator and, if so, a new filter offset value is added to the back pressure threshold value to create an offset back pressure value. The sensed exhaust back pressure value is compared to the back pressure threshold value if the normal filter indicator is provided. The sensed exhaust back pressure value is compared to the offset back pressure value if the new filter indicator is provided. High back pressure faults are logged and an operator observable indicator signal is provided if the sensed exhaust back pressure value is greater than the back pressure threshold value and the normal filter status indicator is provided or if the sensed back pressure value is greater than the offset back pressure threshold value and the new filter indicator is provided.

According to other aspects of the method of the present invention the operation duration value may be either a mileage based value, an engine hours based value, or may be based upon an exhaust temperature profile. The operation duration value for example may be a mileage based value and the predetermined duration may be 3,000 miles or another value at which new particulate filter back pressure faults tend not to occur. The new filter status may be confirmed by flashing an indicator light such as a check engine light or service now light. The back pressure threshold may be a first pressure value. A second pressure value is the sum of the first pressure value and a new filter offset value. The second pressure value is used when the new filter status indicator is provided.

According to other aspects of the method of the present invention a step of setting a diagnostic message to the new filter installed status may be performed by receiving a signal from a diagnostic tool. Alternatively, the step of setting a diagnostic message to the new filter installed status may be performed by receiving a signal from an actuator that is operated in a predetermined series of operations. The predetermined series of operations may be, for example, pressing and releasing a foot pedal a plurality of times within a specified time period with the ignition on.

According to another aspect of the present invention an electronic engine control software system for an engine having an electronic control and a particulate exhaust filter is provided. The system comprises a back pressure sensor that senses the pressure in an exhaust system of the engine upstream from the particulate filter. The back pressure sensor provides a signal representative of a sensed back pressure value. A status indicator is set to a "new status" when the particulate filter was recently changed and is set to a "normal status" when the particulate was not recently changed. A register is provided for a back pressure threshold value that sets a first value if the status indicator is set to normal and sets a second value if the status indicator is set to new. The second value is greater than the first value by a new filter offset value. A comparator compares the sensed back pressure value to the first back pressure threshold value if the status indicator is set to normal and to the second back pressure threshold value if the status indicator is set to new. A log may record data relating to engine operation. A high back pressure fault may be recorded in the log if the comparator determines that the exhaust back pressure value exceeds the first back pressure threshold value and the normal filter indicator is provided or may record a high back pressure fault if the exhaust back pressure value exceeds the second back pressure threshold value and the status indicator is set to new.

According to other aspects of the system of the present invention, a meter may be provided that measures the duration of engine operation. The status indicator is set to new when the particulate filter is replaced and the meter measures the duration of engine operation until a predetermined value for the duration of engine operation is exceeded. The status indicator is reset to normal upon exceeding the predetermined value for duration of engine operation. The meter may measure duration of engine operation based upon vehicle miles traveled or upon time of engine operation. Alternatively, "degreening" of the filter may be calculated based upon the exhaust temperature profile.

According to further aspects of the system of the present invention, the status indicator may be set to new status by a diagnostic tool when the particulate filter is changed. Alternatively, a step of setting a diagnostic message to new filter installed status may be performed by receiving a signal from an actuator that is operated in a predetermined series of operations. For example, the predetermined series of operations may be to press and release a foot pedal a plurality of times within a time period after the ignition is turned on. A step of setting a diagnostic message to new filter installed status may be confirmed by flashing an indicator light such as a check engine light or service now light.

Another aspect of the system of the present invention is to provide an indicator for alerting an operator to a back pressure fault. The indicator may be actuated when the comparator determines that the exhaust back pressure value exceeds the first back pressure threshold value and the status indicator is set to normal or when the back pressure value exceeds the second back pressure threshold value and the status indicator is set to new.

These and other aspects of the present invention will be better understood in view of the attached drawings and following detailed description of the illustrated embodiments.

DETAILED DESCRIPTION OF THE PREFERRED EMBODIMENT(S)

Figure 1:
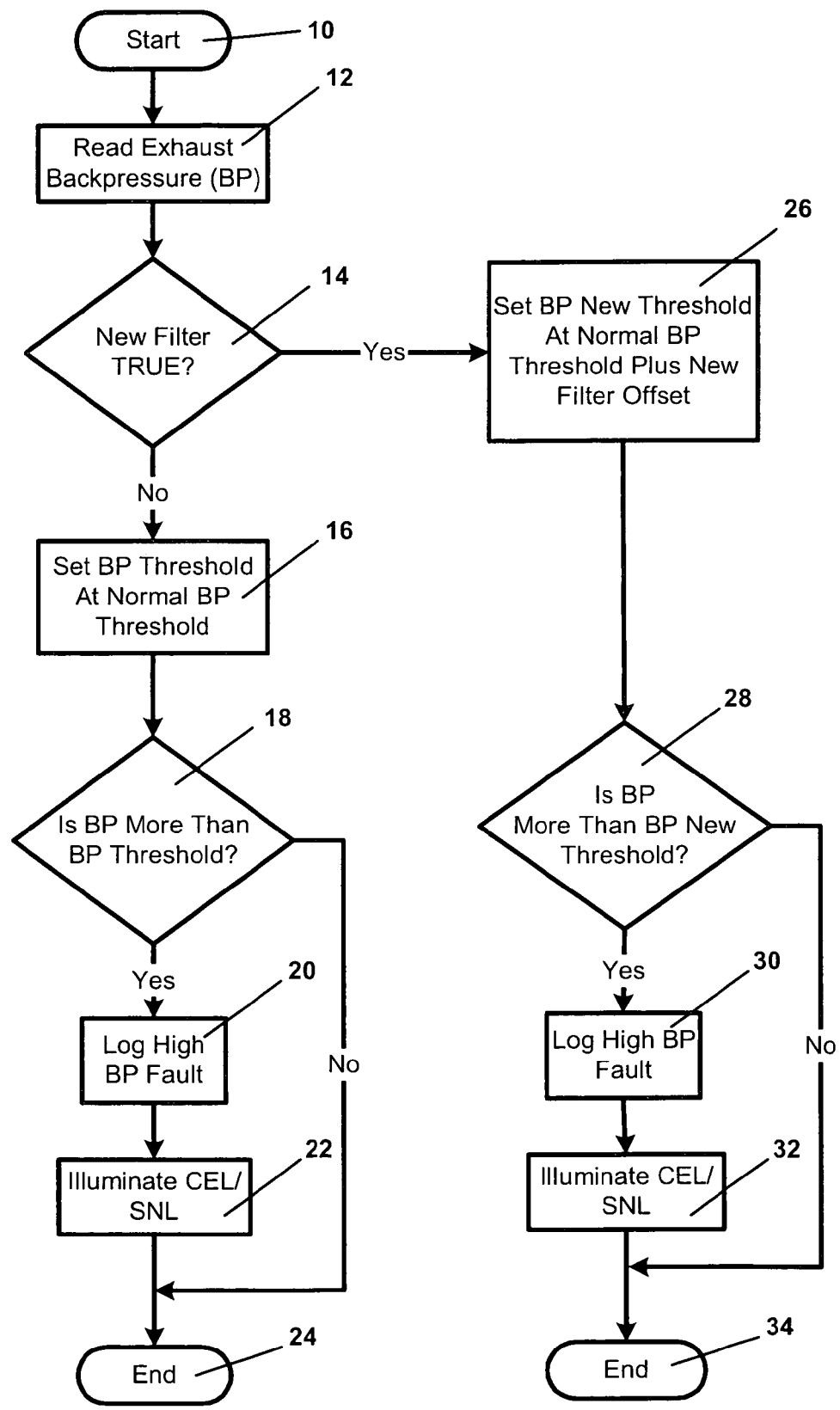
FIG. 1 is a flow chart showing one embodiment of a back pressure fault diagnostic system that is intended to reduce false back pressure faults caused by a new particulate filter.

Referring to FIG. 1, an example of an algorithm for a back pressure fault diagnostic system is illustrated. The description of the system begins at 10, the start block of the flow chart of FIG. 1. The exhaust back pressure is read by a sensor at 12. The sensor is disposed upstream of the particulate filter in the engine exhaust system. The engine control system checks at 14 to determine if a new particulate filter has been provided in the engine exhaust system. If no new filter has been provided, the engine controller sets the back pressure threshold value at the normal back pressure threshold at 16. At 18, the control system determines whether the back pressure is more than the back pressure threshold. If so, the system logs a high back pressure fault at 22 and illuminates a check engine light/service now light at 22 to communicate to a vehicle operator that excessive back pressure has been sensed in the exhaust system and that the particulate filter should be replaced or that the engine should be serviced to address the back pressure fault condition. The process ends at 24.

If a new filter is indicated to be present in the system at 14, the engine control sets a back pressure new threshold to be equal to the normal back pressure threshold plus a new filter offset at 26. If, for example, the normal back pressure is 100 psi and it can be expected that the new filter may cause an increase in back pressure of 25 psi, the new back pressure threshold set at 26 would be 125 psi. If the back pressure sensed at 12 is more than the back pressure new threshold as determined by the engine controller at 28, the system will log a high back pressure fault at 30 and may illuminate the check engine light or service now light at 32. If sensed back pressure is less than the back pressure new threshold at 28, the controller bypasses the fault log at 30 and indication system at 32. The process ends at 34.

Figure 2:
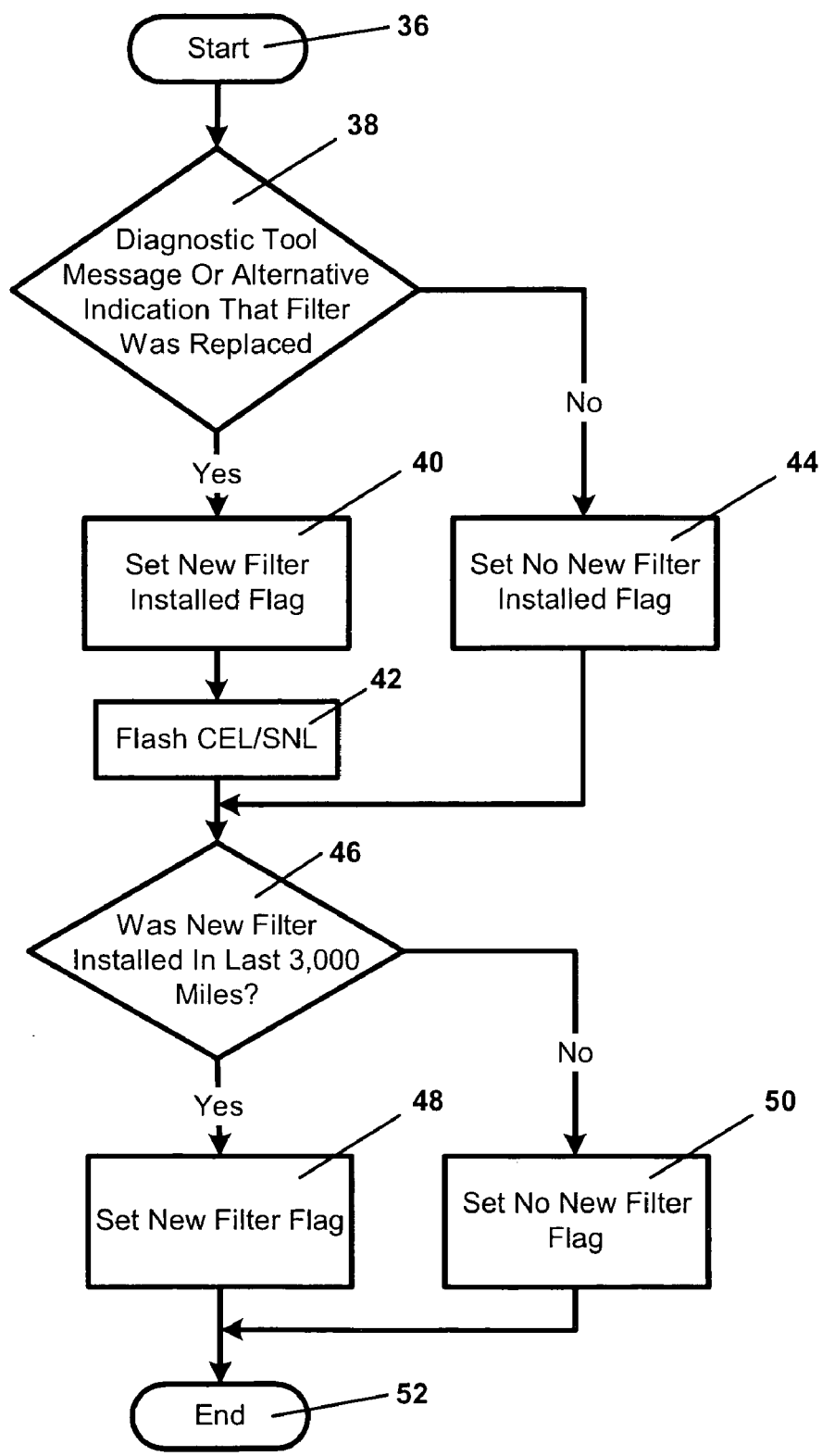
FIG. 2 is a flow chart of one embodiment of a subroutine for providing an indication to the control system that a new particulate filter has been placed in the exhaust system of the engine for a limited period of engine operation duration.

Referring to FIG. 2, a subroutine for engine control system is illustrated that sets the new filter/no new filter flag at 14 in FIG. 1. The subroutine starts at 36 and proceeds to 38 wherein the control system may receive a diagnostic tool message or alternative indication that the filter was replaced. The diagnostic tool message may be sent by a diagnostic tool during the service operation. The message is recorded by the engine control system. An alternative indication that the filter was replaced could be based upon any predefined set of operational steps that can be performed by a service technician as part of, or in conjunction with, the filter replacement process. For example, an alternative indication may be provided by turning the ignition switch on and depressing a foot pedal such as a brake or clutch pedal five times within a ten second period. After the filter replaced message is stored in the control system, the control system sets a new filter installed flag at 40. At this time, the check engine light or service now light may be flashed at 42 to indicate to a service technician that the control system has been updated to reflect the installation of a new filter. If there is no diagnostic message or alternative indication of filter replacement, the no new filter installed flag may be set or retained at 44.

If the new filter installed flag is set, the engine control system checks at 46 to determine if the new filter was installed within a predetermined period of engine operation. For example, at 46 in the illustrated embodiment the measure of engine operation duration is the number of miles of operation of a vehicle. However, it should be understood that for some vehicles or for engines installed in stationary sites such as a power generation plant, or in marine applications generally measure engine operation duration in engine hours. It is also possible to calculate when the filter is less prone to false back pressure faults ("degreened") based upon the exhaust temperature profile. If the engine control determines that the new filter was installed within the predetermined period of engine operation, then the control system sets a new filter flag at 48. If the new filter was not installed within the predetermined period of engine operation duration at 46, then the controller sets a no new filter flag at 50. The subroutine ends at 52. The new filter flag set in 48 or no new filter flag set at 50 is used by the engine control to make the determination of whether there is a new filter at 14 in FIG. 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for avoiding back pressure faults in an engine control system, comprising:
installing a new particulate filter in an engine exhaust system;
setting a diagnostic message to a new filter installed status indication to indicate that the new filter was installed at a first operation duration value;
comparing a current operation duration value to the first operation duration value after the diagnostic message is set to the new filter installed to determine if the current operation duration value is less than the sum of the first operation duration value and a predetermined duration value and providing a new filter indicator, if the current operation duration value is greater than the sum of the first operation duration value and the predetermined duration value and providing a normal filter status indicator;
reading a sensed exhaust back pressure value from a sensor;
setting a back pressure threshold value;
determining whether the diagnostic message is set at the new filter status indicator and, if so, adding a new filter offset value to the back pressure threshold value to create an offset back pressure value;
comparing the sensed exhaust back pressure value to the back pressure threshold value if the normal filter indicator is provided, or comparing the sensed exhaust back pressure value to the offset back pressure value if the new filter indicator is provided; and
logging a high back pressure fault and providing an operator observable indicator signal if the sensed exhaust back pressure value is greater than the back pressure threshold value and the normal filter status indicator is provided or if the sensed exhaust back pressure value is greater than the offset back pressure threshold value and the new filter indicator is provided.

2. The method of claim 1 wherein the operation duration value is a mileage based value.

3. The method of claim 1 wherein the operation duration value is an engine hours based value.

4. The method of claim 1 wherein the operation duration value is a mileage based value and the predetermined duration value is 3,000 miles.

5. The method of claim 1 wherein the new filter status indication is confirmed by flashing an indicator light.

6. The method of claim 1 wherein the back pressure threshold is a first pressure value and the new filter offset value is a second pressure value that is summed with the first pressure value when the new filter status indicator is provided.

7. The method of claim 1 wherein the step of setting a diagnostic message to the new filter installed status is performed by receiving a signal from a diagnostic tool.

8. The method of claim 1 wherein the step of setting a diagnostic message to the new filter installed status is performed by receiving a signal from an actuator that is operated in a predetermined series of operations.

9. The method of claim 1 wherein the predetermined series of operations is to press and release a foot pedal a plurality of times at ignition on within a specified time period.

10. An electronic engine control software system for an engine having an electronic control and a particulate filter, the system comprising:
a back pressure sensor that senses the pressure in an exhaust system of the engine upstream from the particulate filter and provides a signal representative of a sensed back pressure value;
a status indicator being set to a new status when the particulate filter was recently changed and being set to a normal status when the particulate filter was not recently changed;
a register for a back pressure threshold value that sets a first value if the status indicator is set to normal and sets a second value if the status indicator is set to new, wherein the second value is greater than the first value by a new filter offset value;
a comparator for comparing the sensed back pressure value to the first back pressure threshold value if the status indicator is set to normal and to the second back pressure threshold value if the status indicator is set to new;
a log for recording data relating to engine operation, wherein a high back pressure fault is recorded if the comparator determines the exhaust back pressure value exceeds the first back pressure threshold value and the normal filter indicator is provided or that the exhaust back pressure value exceeds the second back pressure threshold value and the status indicator is set to new.

11. The system of claim 10 further comprising a meter that measures the duration of engine operation, wherein the status indicator is set to new when the particulate filter is replaced and the meter measures the duration of engine operation until a predetermined value for the duration of engine operation is exceeded and signals the status indicator to be set to normal.

12. The system of claim 11 wherein the meter measures the duration of engine operation based upon vehicle miles traveled.

13. The system of claim 11 wherein the meter measures the duration of engine operation based upon time of engine operation.

14. The system of claim 10 further comprises an algorithm for calculating whether the particulate filter was recently changed based upon an exhaust temperature profile.

15. The system of claim 10 wherein the status indicator is set to a new status by a diagnostic tool when the particulate filter is changed.

16. The system of claim 10 wherein the step of setting a diagnostic message to new filter installed status is performed by receiving a signal from an actuator that is operated in a predetermined series of operations.

17. The system of claim 16 wherein the predetermined series of operations is to press and release a foot pedal a plurality of times at ignition on.

18. The system of claim 10 wherein the step of setting a diagnostic message to new filter installed status is confirmed by flashing an indicator light.

19. The system of claim 10 further comprises an indicator for alerting an operator to a back pressure fault when the comparator determines that the exhaust back pressure value exceeds the first back pressure threshold value and the status indicator is set to normal or that the exhaust back pressure value exceeds the second back pressure threshold value and the status indicator is set to new.

* * * * *